United States Patent
Iwaki et al.

(10) Patent No.: US 9,251,919 B2
(45) Date of Patent: Feb. 2, 2016

(54) PRESSURIZED WATER REACTOR

(75) Inventors: Chikako Iwaki, Tokyo (JP); Tatsumi Ikeda, Kanagawa (JP); Tetsuzo Yamamoto, Kanagawa (JP); Masanobu Watanabe, Kanagawa (JP); Satoru Abe, Kanagawa (JP); Ken Uchida, Kanagawa (JP); Hisaki Sato, Kanagawa (JP); Ken Okuda, Kanagawa (JP); Kiichi Ito, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 238 days.

(21) Appl. No.: 13/993,227

(22) PCT Filed: Dec. 13, 2011

(86) PCT No.: PCT/JP2011/006946
§ 371 (c)(1),
(2), (4) Date: Sep. 13, 2013

(87) PCT Pub. No.: WO2012/081232
PCT Pub. Date: Jun. 21, 2012

(65) Prior Publication Data
US 2013/0343505 A1    Dec. 26, 2013

(30) Foreign Application Priority Data
Dec. 13, 2010    (JP) .................... 2010-277043

(51) Int. Cl.
*G21C 13/00*    (2006.01)
*G21C 15/02*    (2006.01)
*G21C 13/02*    (2006.01)

(52) U.S. Cl.
CPC .............. *G21C 15/02* (2013.01); *G21C 13/02* (2013.01); *Y02E 30/32* (2013.01)

(58) Field of Classification Search
CPC .............. G21C 3/38; G21C 5/02; G21C 5/10; G21C 13/024
USPC .......................................... 376/362, 453, 461
See application file for complete search history.

(56) References Cited

U.S. PATENT DOCUMENTS

| 5,550,883 A | * | 8/1996 | Bougis .................. 376/302 |
| 6,445,758 B1 | | 9/2002 | Izumi et al. |
| 2007/0133732 A1 | | 6/2007 | Nakayama et al. |

FOREIGN PATENT DOCUMENTS

| CN | 1253362 | | 5/2000 | |
| JP | 01-266394 A | | 10/1989 | |
| JP | 01266394 A | * | 10/1989 | ............... F16M 7/00 |

(Continued)

*Primary Examiner* — Jack W Keith
*Assistant Examiner* — Marshall O'Connor
(74) *Attorney, Agent, or Firm* — Foley & Lardner LLP

(57) ABSTRACT

The pressurized water reactor according an embodiment comprises: a cylindrical reactor pressure vessel (1) to which inlet nozzles are connected; fuel assemblies which are contained within the reactor pressure vessel (1); a cylindrical reactor core barrel (3) which surrounds the fuel assemblies and forms an annular downcomer (6) between the reactor core barrel (3) and the inner surface of the reactor pressure vessel (1); and radial supports. The radial supports are supports which are arranged below the downcomer (6) at intervals in the circumferential direction, each has vertical flow path formed therein, and position the reactor core barrel (3) and the reactor pressure vessel (1). The radial supports each has, for example, a flow path-equipped radial keys (21) and a key groove member (40).

7 Claims, 4 Drawing Sheets

(56) References Cited

FOREIGN PATENT DOCUMENTS

| JP | 07-306288 A | 11/1995 |
| JP | 08-062372 A | 12/2002 |
| JP | 2002-357688 A | 12/2002 |
| JP | 2005-024383 A | 1/2005 |

* cited by examiner

PRESSURIZED WATER REACTOR

TECHNICAL FIELD

The present invention relates to a pressurized water reactor.

BACKGROUND ART

In a pressurized water reactor, primary coolant led to a reactor is heated by heat energy from fuel assemblies in the reactor and then led to a steam generator. In the steam generator, the heated primary coolant and the secondary coolant are subjected to heat exchange, and the steam generated from the boiling secondary coolant is led to a turbine to be used for power generation.

FIG. 6 is an elevational cross-sectional view schematically illustrating a conventional pressurized water reactor. A reactor pressure vessel 1 is substantially a cylindrical vessel having a vertically-extending axis. The reactor pressure vessel 1 has inlet nozzles 4 through which primary coolant is introduced and outlet nozzles 5 through which heated primary coolant flows out. The reactor pressure vessel 1 has, inside thereof, a large number of fuel assemblies 2, a cylindrical reactor core barrel 3 surrounding the fuel assemblies 2, and a lower core support plate 8 supporting the fuel assemblies 2. An annular downcomer 6 is formed between the reactor pressure vessel 1 and the reactor core barrel 3. Radial keys 9 are installed at a lower portion of the downcomer 6 as radial supports for positioning the reactor pressure vessel 1 in radial directions.

The primary coolant is introduced into the reactor pressure vessel 1 through the inlet nozzles 4 and flows down in the downcomer 6. The primary coolant streams merge in a lower plenum 7 formed below the fuel assemblies 2. The merged primary coolant is then turned 180° and passes upwardly through the lower core support plate 8 and fuel assemblies 2 in the reactor core barrel 3. The primary coolant heated in the fuel assemblies 2 reaches an upper portion of the reactor pressure vessel 1 to be mixed therein, flows out through the outlet nozzles 5, and led to a steam generator (not illustrated).

In such a pressurized water reactor, when a flow rate or a pressure of the primary coolant becomes non-uniform at normal operation time, the fuel assemblies 2 are cooled unevenly. Thus, it is important to supply uniformly-distributed primary coolant to the fuel assemblies 2.

In order to make the coolant flowing through the inlet nozzles uniform in a circumferential direction, there is proposed installation of a streamline shape separation preventing member in the downcomer and formation of radial supports (radial keys) into a streamline shape (Patent Document 1).

PRIOR ART DOCUMENT

Patent Document

Patent Document 1: Japanese Patent Application Laid-Open Publication No. 2005-24383

SUMMARY OF THE INVENTION

Problems to be Solved by the Invention

As described above, there is proposed a configuration in which the primary coolant flowing down in the downcomer is made uniform in order to make uniform the primary coolant flowing through the fuel assemblies of the reactor. However, the conventional technique in which the separation preventing member is installed in the downcomer or the radial supports are formed into streamline shapes has an effect of preventing flow separation in a local area but has a difficulty in making the primary coolant uniform in the entire circumference of the downcomer.

The present invention has been made to solve the above problem, and an object thereof is to provide an in-core structure of a nuclear reactor capable of making the primary coolant flowing down in the downcomer uniform in the circumferential direction and supplying the uniformly-distributed primary coolant to the fuel assemblies.

Means for Solving the Problem

In order to achieve the object, there is provided a pressurized water reactor comprising: a cylindrical reactor pressure vessel having a vertically-extending axis and connected with a plurality of inlet nozzles at its side surface; a plurality of fuel assemblies accommodated in the reactor pressure vessel; a cylindrical reactor core barrel having a vertically-extending axis, the reactor core barrel surrounding the plurality of fuel assemblies, and forming an annular downcomer between itself and an inner side surface of the reactor pressure vessel; and a plurality of radial supports arranged spaced apart from each other in a circumferential direction in the downcomer provided below the inlet nozzles so as to position the reactor core barrel and the reactor pressure vessel, wherein a vertically-extending flow path is formed in each of the radial supports.

Advantage of the Invention

According to the present invention, it is possible to make the primary coolant flowing down in the downcomer uniform in the circumferential direction and to supply the uniformly-distributed primary coolant to the fuel assemblies.

EMBODIMENTS FOR CARRYING OUT THE INVENTION

Embodiments of a pressurized water reactor according to the present invention will be described below with reference to the accompanying drawings.

First Embodiment

Figure 1:
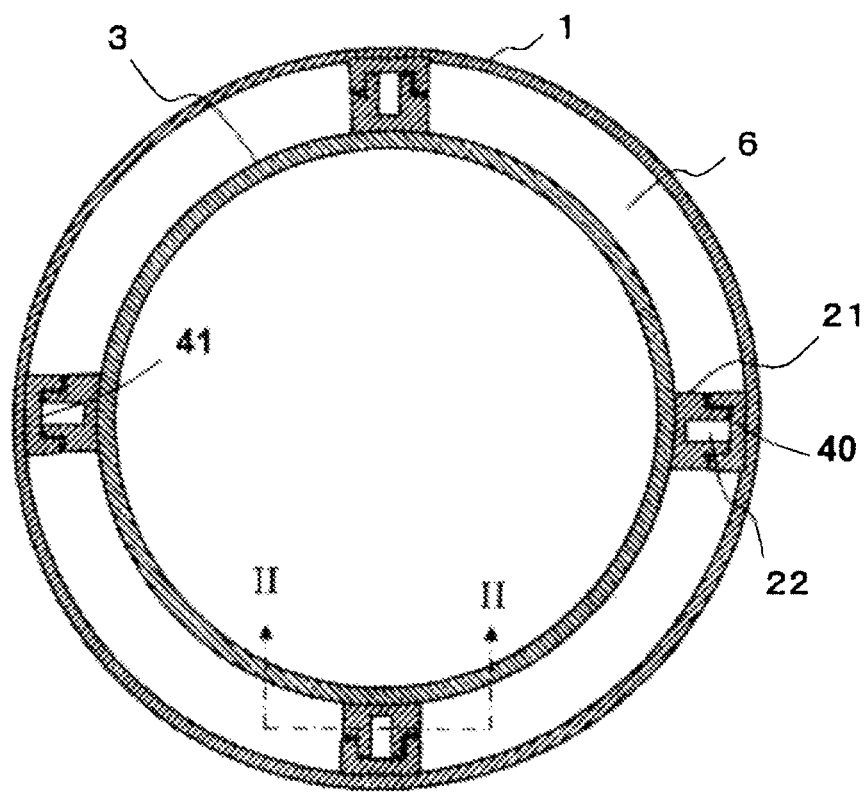
FIG. 1 is a horizontal cross-sectional view illustrating an in-core structure of a pressurized water reactor according to a first embodiment.
Figure 2:
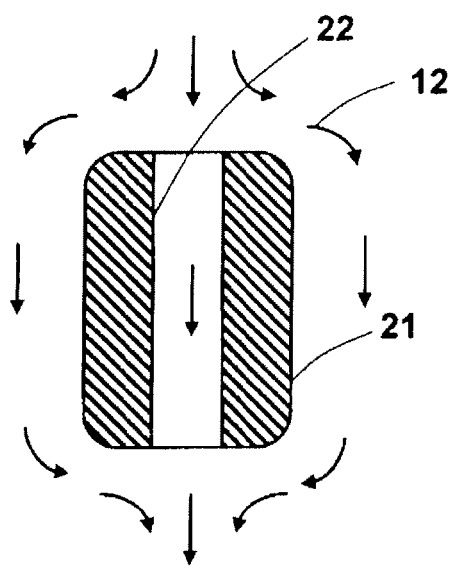
FIG. 2 is an elevational cross-sectional view taken along line II-II of FIG. 1 as viewed in a direction of arrows, which illustrates a configuration of a flow path-equipped radial key according to the first embodiment.

A first embodiment of the present invention will be described using FIGS. 1 and 2.

The same reference numerals are given to the same or similar parts as those in the conventional in-core structure, and the repeated description will be omitted.

In the present embodiment, flow path-equipped radial keys 21 and key groove members 40 are used as radial supports. Each of the radial keys 21 has a flow path 22 inside thereof.

Four flow path-equipped radial keys 21 are mounted to outside of the reactor core barrel 3 at a lower portion thereof so as to be spaced apart from each other in a circumferential direction. Each of the flow path-equipped radial keys 21 has a vertically-extending protrusion. The key groove members 40 each is mounted to a position facing one of the flow path-equipped radial keys 21. Each of the key groove members 40 has a vertically-extending key groove 41. Each of the protrusion of the flow path-equipped radial keys 21 is fitted to one of the key grooves 41 to thereby achieve positioning of the reactor core barrel 3 within the reactor pressure vessel 1.

The coolant flow path 22 through which the coolant flows vertically is provided in a center of each of the flow path-equipped radial keys 21.

Figure 6:
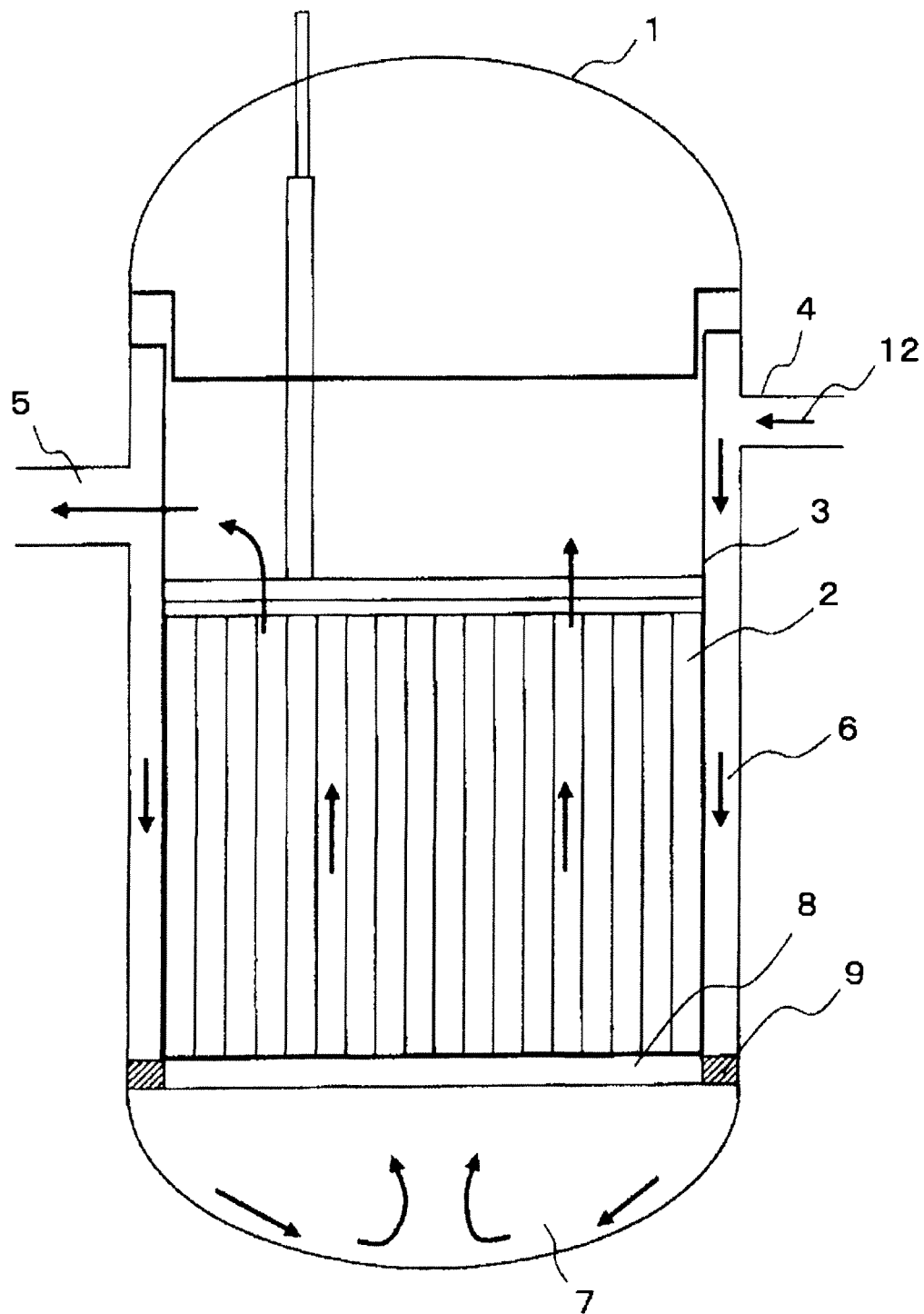
FIG. 6 is an elevational cross-sectional view schematically illustrating a conventional pressurized water reactor.

Other configurations are the same as those in the conventional technique described using FIG. 6.

In the thus configured present embodiment, the reactor core barrel 3 is positioned by the flow path-equipped radial keys 21 and the key groove members 40 with a clearance with respect to reactor pressure vessel 1. Flow 12 of the primary coolant going down in the downcomer 6 is separated into left and right flows when passing through the flow path-equipped radial keys 21. In addition, flows in which the primary coolant passes through the coolant flow paths 22 formed in the centers of the flow path-equipped radial keys 21 occur. This prevents flow separation which may occur when the coolant passes through the flow path-equipped radial keys 21. As a result, it is possible to prevent a flow rate of the primary coolant toward the fuel assemblies 2 positioned on the downstream side of the flow path-equipped radial keys 21 from being locally decreased.

Although the flow path-equipped radial keys 21 are fixed at four locations in the circumferential direction in the present embodiment, the number of the flow path-equipped radial keys 21 may be increased or decreased as needed. Further, although the flow paths 22 are provided in the components on the reactor core barrel 3 side in the embodiment described above, the flow paths 22 may be provided in the component on the reactor pressure vessel 1 side or may be provided in both the components on the reactor core barrel 3 side and the reactor pressure vessel 1 side.

Further, in the illustrated example, the flow path-equipped radial keys 21 are mounted to the outside of the reactor core barrel 3, and the key groove members 40 are mounted to the inside of the reactor pressure vessel 1. Conversely, however, the key groove members 40 may be mounted to the outside of the reactor core barrel 3, and the flow path-equipped radial keys 21 may be mounted to the inside of the reactor pressure vessel 1.

Second Embodiment

Figure 3:
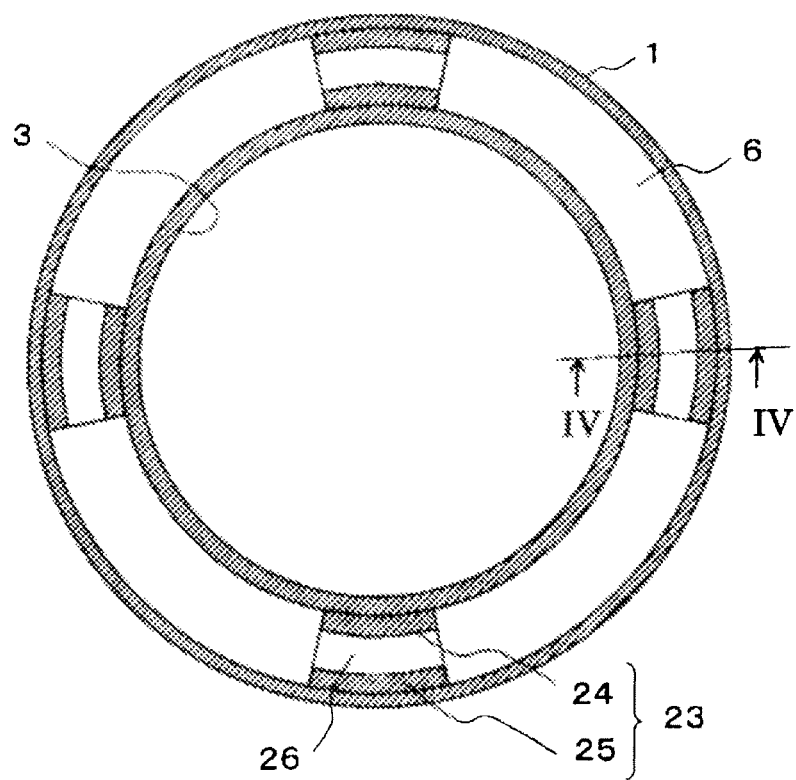
FIG. 3 is a horizontal cross-sectional view illustrating an in-core structure according to a second embodiment.
Figure 4:
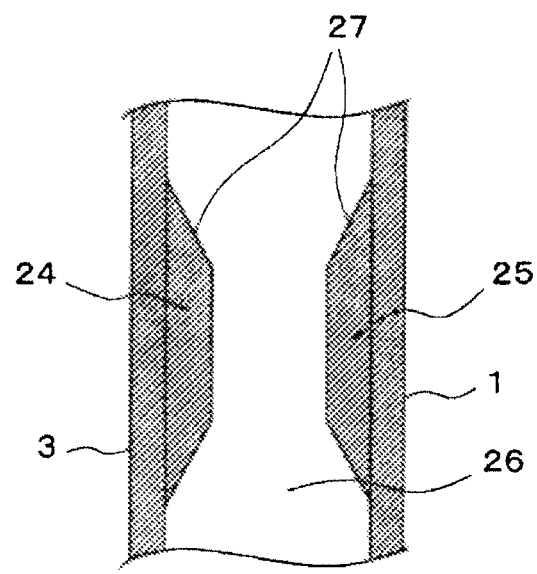
FIG. 4 is an elevational cross-sectional view taken along line IV-IV of FIG. 3 as viewed in a direction of arrows.
Figure 5:
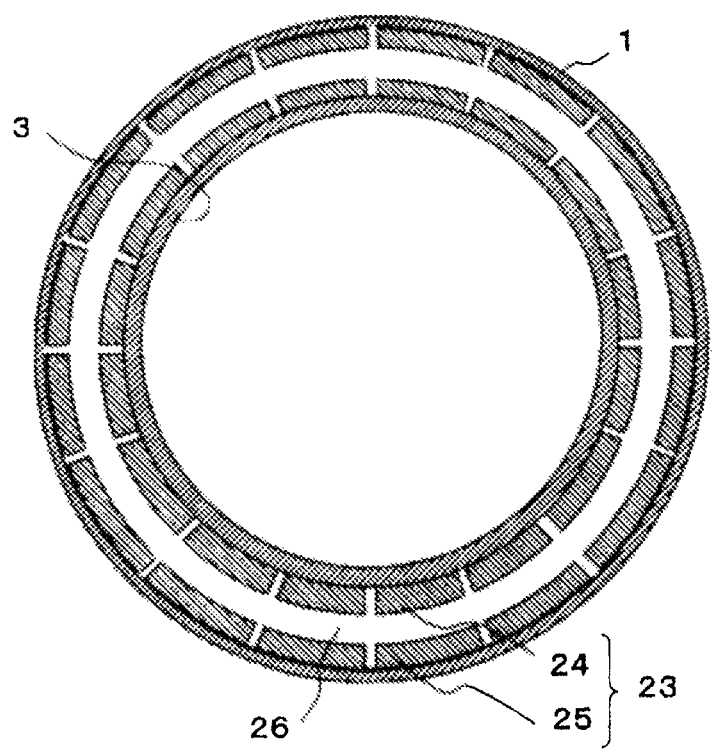
FIG. 5 is a horizontal cross-sectional view illustrating a modification of the in-core structure according to the second embodiment.

A second embodiment of the present invention will be described using FIGS. 3 to 5. The same reference numerals are given to the same or similar parts as those in the first embodiment, and the repeated description will be omitted.

In the second embodiment, in place of the radial supports composed of the flow path-equipped radial keys 21 and the key groove members 40, radial supports 23 each composed of a pair of magnetic bodies 24 and 25 are used. Each of the radial supports 23 includes the magnetic body 24 fixed to the reactor core barrel 3 side and the magnetic body 25 fixed to the reactor pressure vessel 1 side so as to face the magnetic body 24. A plurality of the radial supports 23 are arranged in the circumferential direction of the reactor core barrel 3. The magnetic bodies 24 and 25 facing each other are magnetized so as to attract or repel each other.

Flow paths 26 are formed between the magnetic bodies 24 and 25. As illustrated in FIG. 4, slopes 27 for reducing a flow resistance may be formed in vertical upper and lower ends of the magnetic bodies 24 and 25.

In the thus configured present embodiment, the reactor core barrel 3 is positioned in a radial direction by electromagnetic forces attracting each other (or electromagnetic forces repelling each other) in a non-contact manner. Achievement of the positioning in a non-contact manner allows an increase in a clearance for the flow paths 26 and allows the flow paths to be arranged uniformly in the circumferential direction, thereby preventing a flow rate of the primary coolant from being locally decreased.

Although four radial supports 23 are used in the present embodiment, the number of the radial supports may be arbitrarily changed. For example, in a modification illustrated in FIG. 5, a large number of radial supports 23 are arranged over the entire circumferential direction of the reactor core barrel 3.

Other Embodiments

Although the preferred embodiments of the present invention have been described above, the embodiments are merely illustrative and do not limit the scope of the present invention. These novel embodiments can be practiced in other various forms, and various omissions, combinations, substitutions and changes may be made without departing from the scope of the invention. The embodiments and modifications thereof are included in the scope or spirit of the present invention and in the appended claims and their equivalents.

For example, the features of the respective embodiments may be combined in one pressurized water reactor.

EXPLANATION OF SYMBOLS

1: Reactor pressure vessel
2: Fuel assembly
3: Reactor core barrel
4: Inlet nozzle
5: Outlet nozzle
6: Downcomer
7: Lower plenum
8: Lower core support plate
9: Radial key
21: Flow path-equipped radial key
22: Flow path
23: Radial support
24, 25: Magnetic body
26: Flow path
27: Slope
40: Key groove member
41: Key groove

What is claimed is:
1. A pressurized water reactor comprising:
a cylindrical reactor pressure vessel having a vertically-extending axis and connected with a plurality of inlet nozzles at a side surface thereof;
a plurality of fuel assemblies accommodated in the reactor pressure vessel;

a cylindrical reactor core barrel having a vertically-extending axis, the reactor core barrel surrounding the plurality of fuel assemblies, and forming an annular downcomer between itself and an inner side surface of the reactor pressure vessel; and a plurality of radial supports arranged spaced apart from each other in a circumferential direction in the downcomer provided below the inlet nozzles so as to position the reactor core barrel and the reactor pressure vessel, wherein each of the radial supports includes:

a key groove member having a vertically extending key groove, the key groove member being fixed to one of the inner side surface of the reactor pressure vessel and an outside of the reactor core barrel; and a key having a vertically extending flow path therein, the key being fixed to the other of the inner side surface of the reactor pressure vessel and the outside of the reactor core barrel, the key protruding towards a corresponding key groove member to fit in the key groove of the corresponding key groove member.

2. The pressurized water reactor according to claim 1, wherein
the key groove members are fixed to the inner side surface of the reactor pressure vessel; and
the keys protrude outward from the reactor core barrel and are inserted at least partially into the corresponding key grooves.

3. The pressurized water reactor according to claim 1, wherein
the key groove members are fixed to the outside of the reactor core barrel; and
the keys protrude inward from the inner side surface of the reactor pressure vessel and are inserted at least partially into the corresponding key grooves.

4. The pressurized water reactor according to claim 1, wherein
each of the radial supports includes a first magnetic body fixed to the inner side surface of the reactor pressure vessel and a second magnetic body fixed to the outside of the reactor core barrel so as to face the first magnetic body.

5. The pressurized water reactor according to claim 4, wherein
the radial supports are installed over an entire circumferential direction of the reactor core barrel.

6. The pressurized water reactor according to claim 1, wherein
the key has a protruding portion that protrudes towards the corresponding key groove member, and
the vertically extending flow path of the key is provided within the protruding portion of the key.

7. The pressurized water reactor according to claim 6, wherein
the vertically extending flow path of the key is provided in a center of the protruding portion of the key.

* * * * *